United States Patent [19]
Yang

[11] Patent Number: 5,299,838
[45] Date of Patent: Apr. 5, 1994

[54] PIPE CONNECTION WITH CLIP ASSEMBLY HAVING PIVOTING PLATES

[76] Inventor: Ming-Tung Yang, No. 4-3, Lane 97, Lung Chuan St., Panchiao, Taipei Hsien, Taiwan

[21] Appl. No.: 903,747
[22] Filed: Jun. 25, 1992
[51] Int. Cl.5 ............................................. F16L 21/08
[52] U.S. Cl. ...................... 285/88; 285/104; 285/320
[58] Field of Search ............... 285/320, 87, 88, 104, 285/39

[56] References Cited

U.S. PATENT DOCUMENTS

| | | | |
|---|---|---|---|
| 1,930,194 | 10/1933 | Dillon | 285/104 |
| 2,473,046 | 6/1949 | Adams | 285/104 |
| 3,679,241 | 7/1972 | Hoffman | 285/340 |
| 3,744,824 | 7/1973 | Roos | 285/320 |
| 4,188,051 | 2/1980 | Burge | 285/104 |
| 4,431,216 | 2/1984 | Legris | 285/104 |
| 4,613,172 | 9/1986 | Schattmaier | 285/340 |

FOREIGN PATENT DOCUMENTS

| | | | |
|---|---|---|---|
| 2226151 | 12/1973 | Fed. Rep. of Germany | 285/320 |
| 558060 | 6/1958 | Italy | 285/320 |

*Primary Examiner*—Eric K. Nicholson
*Attorney, Agent, or Firm*—Bacon & Thomas

[57] ABSTRACT

An improved pipe connection comprises a connection slot, a sleeve and a clip assembly. When a pipe is inserted therein, the clip assembly is used to thrust the pipe into the slot while anti-skiing plates and stretching clips automatically grasp the pipe such that a complete connection can be completed within a very short moment.

4 Claims, 5 Drawing Sheets

PIPE CONNECTION WITH CLIP ASSEMBLY HAVING PIVOTING PLATES

BACKGROUND OF THE INVENTION

Conventional pipe joints as a whole are of simple structure, that is, female thread is cut in the interior of a joint while male thread is on the surface of the end of pipe-to-be-connected. Having the threaded end sealed with plastic tape, the pipe is then screwed into the joint, and a wrench or spanner is used to tighten the joint. As wrenches and spanners, however, are not common tools for ordinary people, such work has general become exclusive for plumbers and is difficult to be simplified. Moreover, inconvenience during this process is encountered as thread cutting, tape sealing and spanner tightening are to be proceeded in the field to match the actual lining. In response to these problems, people have invented fast-assembled joints to eliminate difficulties and inconveniences caused. Some of these kinds of fast-assembled joints are even being applied to water pipe connections resulted in simplified and prompt performance. However, the high cost both in material and energy in such known joints are not economical.

SUMMARY OF THE INVENTION

An improved pipe connection of the invention constitutes a more simplified, fast-assembled and high performance joint structured with a connection slot, a sleeve and a clip assembly. When a pipe is being inserted, the clip assembly is used to thrust the pipe into the slot while anti-skiing plates and stretching clips are provided to grasp the pipe-to-be-connected. With this arrangement, the connection is completed within a very short moment without the need of other materials or tools and a prompt and quick connection is obtained.

BRIEF DESCRIPTION OF DRAWINGS

FIG. 3a is a sectional illustration for the assembly of parts of the invention.

FIG. 3b is an enlarged view of a portion of the assembly of FIG. 3a.

DETAIL DESCRIPTION OF THE PREFERRED EMBODIMENT

Figure 1:
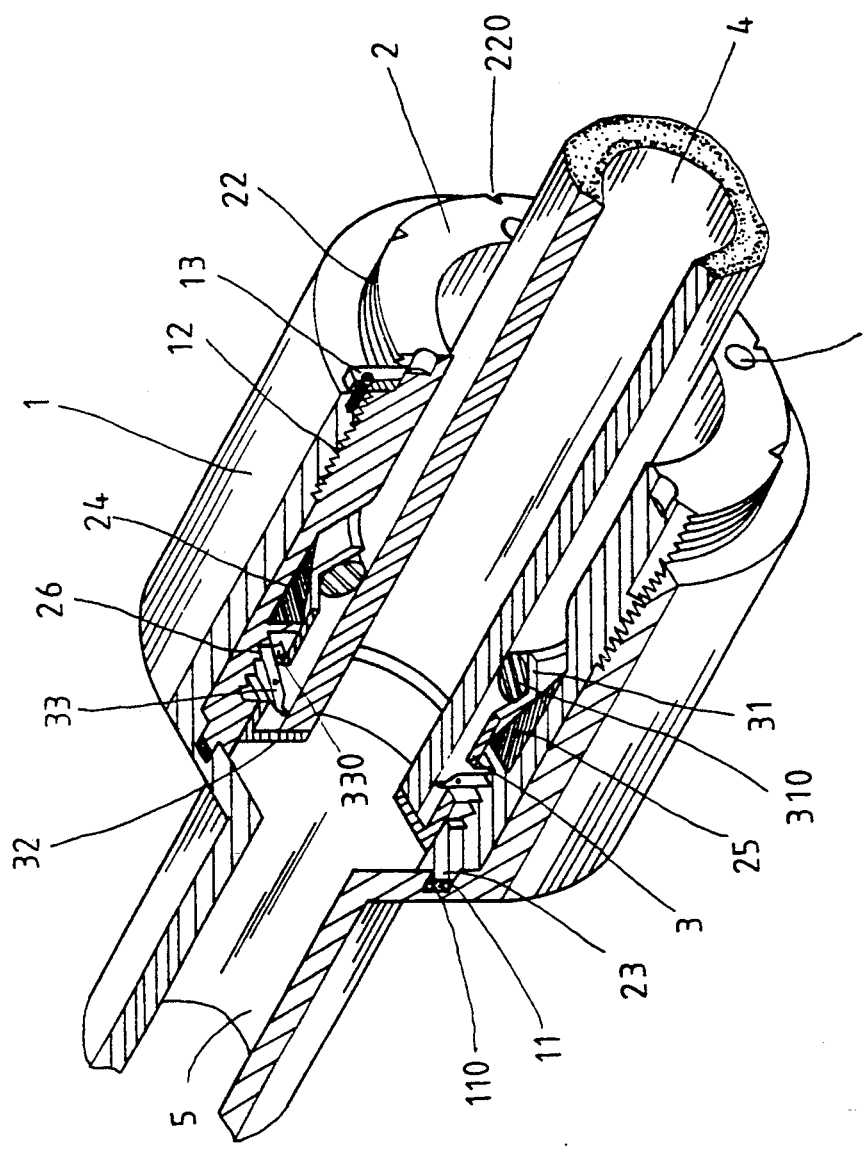
FIG. 1 is a 3-D drawing of the invention with cross sections of parts.
Figure 2:
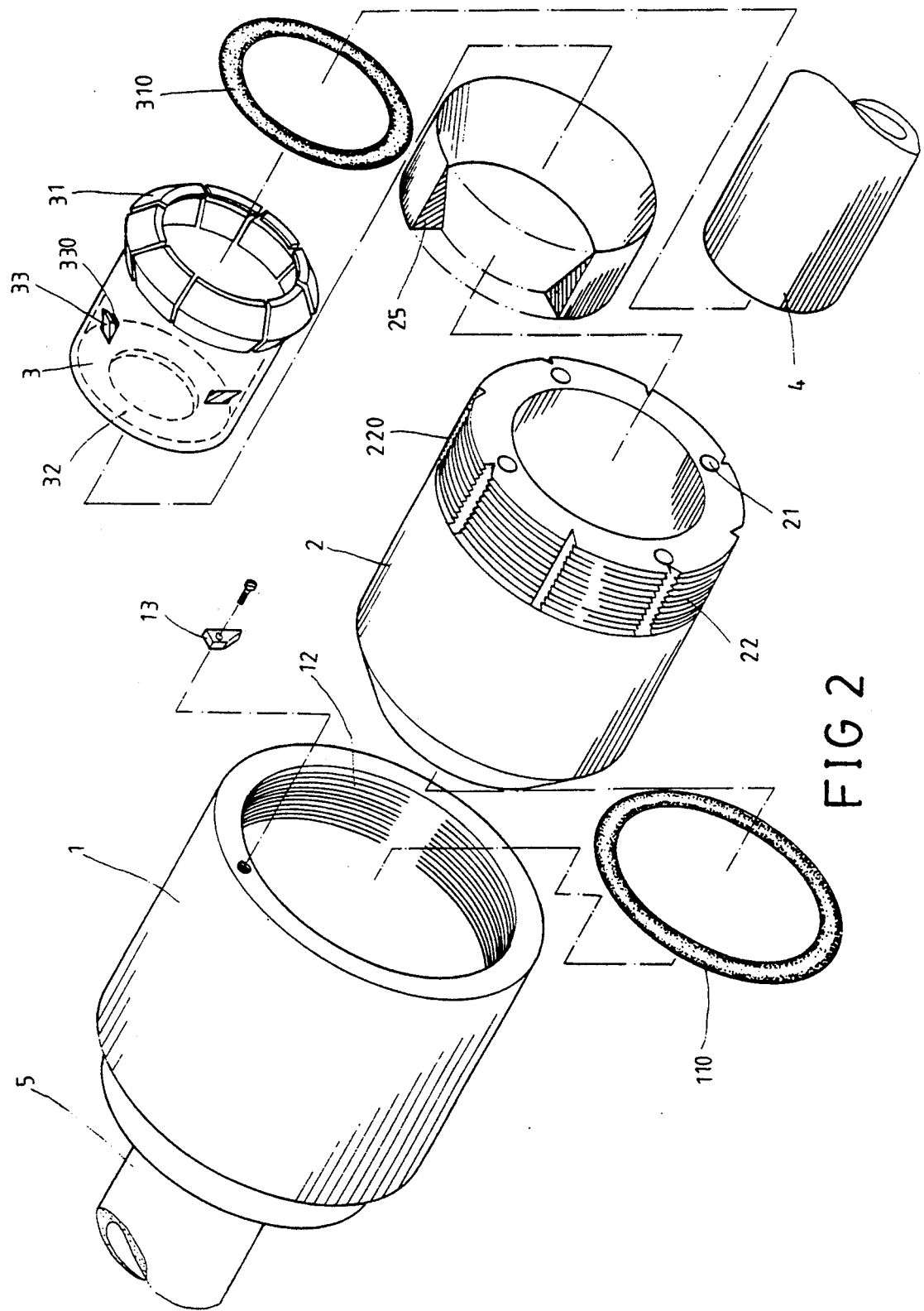
FIG. 2 is an illustration of parts of the invention.

Referring to FIGS. 1 and 2, the invention relates to pipe connection that provides a more simplified, fast-assembled and good water resistance connection. It consists of a connection slot (1), a sleeve (2), and a clip assembly (3) of which the connection slot (1) is the open end of a joint inside whose interior a ring-shaped grooved (1), equipped with a soft gasket (110), is cut on the folded part for water resistance and at whose outlet a section of female thread (12) is cut in the interior for the screwing of sleeve (2) which shall be screw-lightening by anti-skiing reeds (13) at the mouth for an elastic stopping effect. Designed for the connection slot (1), the sleeve (2) is a short empty cylinder on the surface of whose flange action holes (21) are drilled for stress applied by a wrench and a male thread (22) is cut on the surface for the connection with the connection slot (1).

Apart from the male thread (22), conical grooves (220) in even number are drawn perpendicular to the edge for the installation of the anti-skiing reeds (13) after the connection slot (1) is screwed to avoid dropping out when unscrewed. On the top and at the bottom of the sleeve (2), corresponding bulging rings (23) at the position identical to that of the ring-shaped grooved (1) inside the connection slot (1) are designed to click onto the ring-shaped grooved (1) after the sleeve (2) is screwed into the connection slot (1) and thrust the soft gasket (110) for the best water resistance. Thereafter, the anti-skiing reeds (13) are to be inserted into the conical grooves (220) to stop the sleeve (2) from being unscrewed. In the middle of the interior of the sleeve (2), three conical guided rubber stopper-rings (25) are positioned in a hollow groove (24). In the lower part of the sleeve (2), one-way anti-skiing teeth (26) are cut to avoid the ejection of the clip assembly (3).

Figure 3:
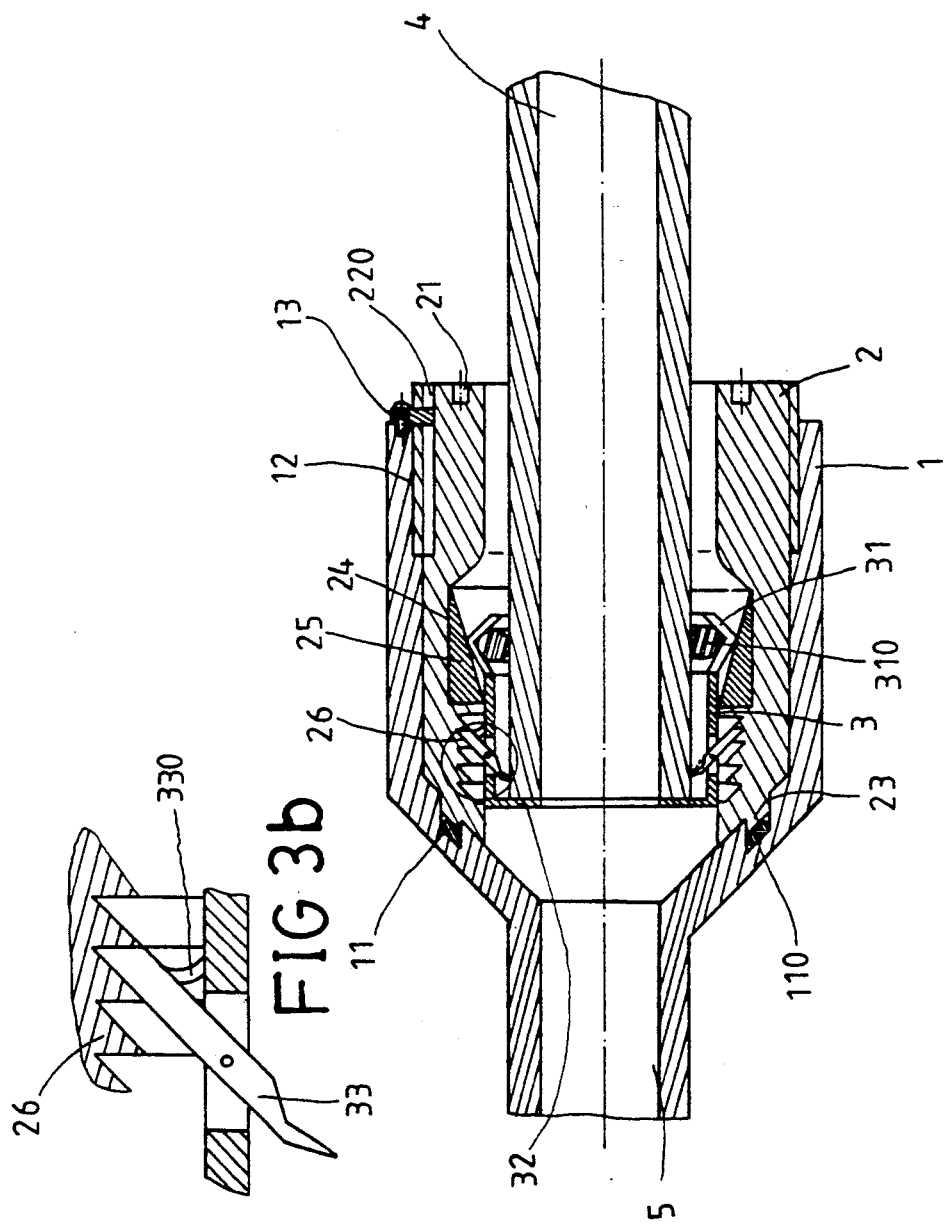

The clip assembly (3) is a short pipe having the particular cross section shape best shown in FIG. 3b and the exterior of whose flange is designed to match the internal flange surface of the sleeve (2). Stretching clips (31) on the top of the flange are structured with a special angle so that their size is slightly bigger than that of the external surface of the pipe-to-be-connected (4). A set of soft stopper-rings (310) is positioned in the interior of the folded part of the stretching clips (31) at a stretching angle which matches that of the conical guided rubber stopper-rings (25). In addition, the bottom of the clip assembly (3) includes a folded-in stopper-ring (32) having an internal diameter equal to that of the joint (5) and the pipe-to-be-connected (4) so that when the pipe-to-be-connected (4) is inserted, the thickness of its body will push against the stopper-ring (32) and force the clip assembly (3) to move inward. In the middle internal surface of the clip assembly (3), there is a set of pivotally mounted anti-skiing plates (33) in even number whose internal edge at the front are unevenly drawn to be out-bulged reeds (330) so that when the clip assembly (3) is connected to the sleeve (2), the end of the stretching clips (31) press against the conical surface of the rubber stopper-rings (25) inside the sleeve (2) and the reeds (330) of the anti-skiing plates (33) shall click onto the first tooth groove of the one-way anti-skiing teeth (26) for tightening.

Referring to FIGS. 3a and 3b, the assembly of the invention shall be completed by screwing the sleeve (2) into the connection-slot (1) to make the bulging rings (23) thrust against the soft gasket (110) inside the ring-shaped grooved (1) to obtain the first level of water resistance. Then insert the clip assembly (3) into the sleeve (2) so that the stretching clips (31) shall press against the conical surface of the rubber stopper-rings (25) on the hollow groove (24). At the same time, the anti-skiing plates (33) shall click onto the first tooth groove of the one-way anti-skiing teeth (26) and a reserved room for the pipe-to-be-connected (4) shall be obtained by the stopper-ring (32).

Figure 4:
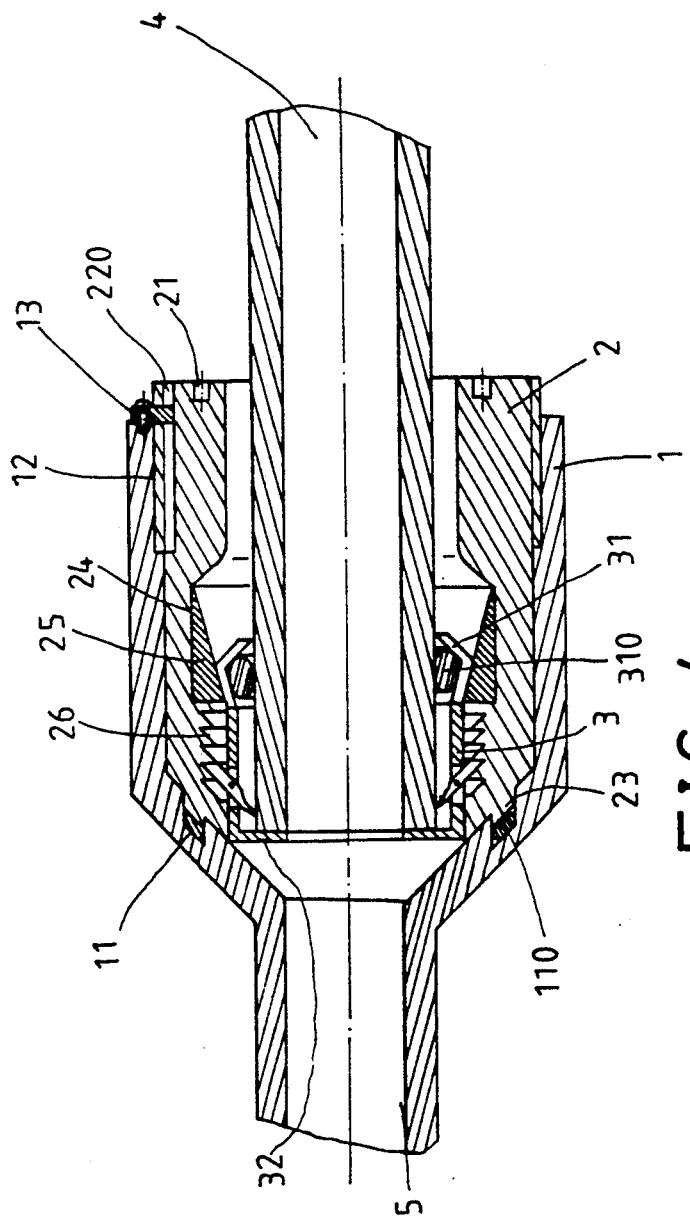
FIG. 4 is an illustration of the insertion of the pipe-to-be-thrust.

When the pipe-to-be-connected (4) is inserted into the joint (5) as shown in FIG. 4, its upper part shall press against the stopper-ring (32) and its surface shall simultaneously press against the ends of the anti-skiing plates (33) which forces anti-skiing plates (33) to rotate so their front shall release from the one-way anti-skiing teeth (26) while the end shall grasp the outer surface of the pipe-to-be-connected (4). Now, the clip assembly (3)

is released from its clipping ability and its front is being pushed by the pipe-to-be-connected to move inward gradually. The action makes not only the stopper-ring (32) move forward inside the connection slot (1), it also permits the stretching clips (31) to squeeze into the rubber stopper-rings (25) whose conical surface shall thrust the stretching clips (31) towards the pipe-to-be-connected (4) and grasp it. Also, the stopper-rings (310) inside the stretching clips (31) are pressured, pressing against the stretching rings (31) and the outer surface of the pipe-to-be-connected (4). The functioning of the rubber stopper-rings (25) and stopper-rings (310) provides second and third levels of water resistance. Moreover, when the pipe-to-be-connected (4) is inserted into the clip assembly (3), the pipe body will be grasped by the sharp folded end of the anti-siding plates (33) while the other ends of the anti-skiing plates (33) will click onto the one-way anti-skiing teeth (26) by ejection of the reeds (330) and the stretching clips (31) is grasping the pipe body when pressed by the conical surface of the rubber stopper-rings (25) so that when the pipe-to-be-connected (4) is inserted, the anti-skiing plates (33) and the stretching clips (31) are both grasping the pipe which guarantees a no drop-out, no dripping, simple and reliable pipe connection.

Figure 5:
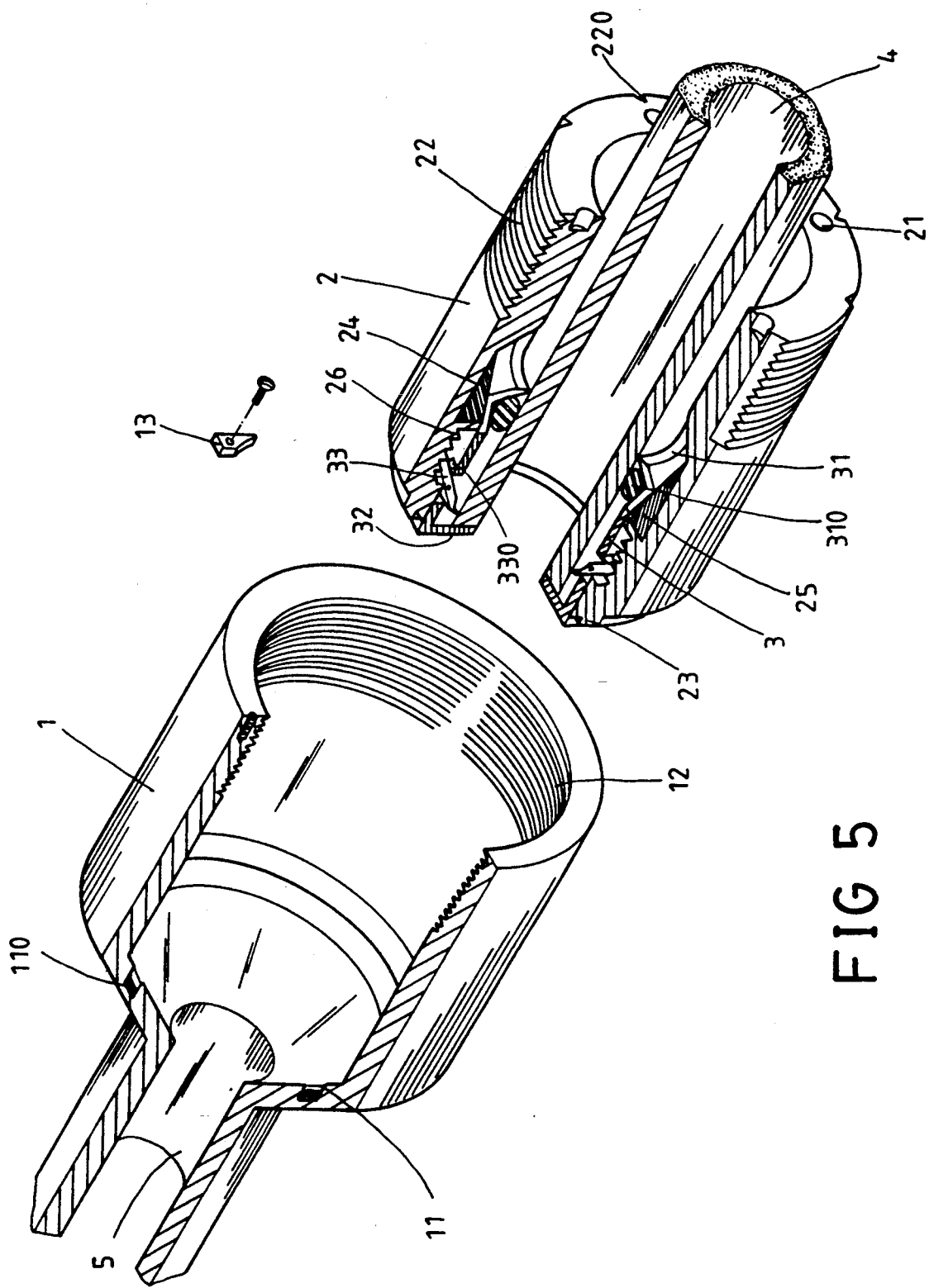
FIG. 5 is an illustration for the unload of pipe after assembled.

Although it is a long description on the procedure for connection, the actual process in the field is just to press the pipe-to-be-connected (4) to the bottom of the joint as the entire joint body shall be prepared inside a factory. All the procedures shall be completed in a few seconds without the need of any tools or materials. This novel, prompt and practical device is also applicable to flowing water pipe connections. Moreover, in case of a misconnection due to any mistake made by workers, the invention shall be unloaded as shown in FIG. 5. The procedure is first to unload the anti-skiing reeds (13), then insert the aforementioned specially-shaped wrench into the action holes (21), unscrew the sleeve (2) and loosen it from the connection slot (1) so that the sleeve (2), clip assembly (3) and the pipe-to-be-connected shall be unloaded easily. The reloadable characteristic of the invention also functions to save money and eliminate cost.

From the above description of the invention, it is clear that the purpose of the invention is to provide an improved pipe connection that provides a simplified and prompt pipe connection by just inserting a pipe with little effort into a connector without the need of any other materials or tools.

I claim:

1. A pipe connection comprising:

a connection slot located at an open end of a first pipe, said connection slot including an internally threaded portion adjacent said open end and a ring-shaped groove formed therein at a position remote from said open end;

a gasket positioned within said ring-shaped groove;

a sleeve defined by a hollow cylinder having axially spaced first and second ends, said sleeve including an externally threaded portion adjacent said first end and a bulging ring extending axially from said second end, said sleeve further including an internal groove and a plurality of axially spaced, one-way teeth formed between said first and second ends, said sleeve being adapted to be received within said connection slot with the externally threaded portion of said sleeve threadably engaging the internally threaded portion of said connection slot and said bulging ring extending into said ring-shaped groove;

a conically shaped stopper ring positioned within the internal groove of said sleeve, said conically shaped stopper ring increasing in size toward the second end of said sleeve;

a clip assembly including a short pipe member sized to match the internal diameter of said sleeve, said clip assembly having one end thereof formed with a radially extending flange ring and a second end thereof formed with a plurality of stretching clips that are adapted to deflect upon engagement with said sleeve and to engage said conically shaped stopper ring when said clip assembly is positioned within said sleeve, said clip assembly further including circumferentially spaced anti-skiing plates, each of said anti-skiing plates being pivotally mounted to said short pipe member intermediate a first end of the anti-skiing plate which is adapted to engage at least one of said plurality of axially spaced, one-way teeth and a second end thereof; and a sealing ring positioned within said clip assembly at said stretching clips, said sealing ring being adapted to engage, along with the second end of each of said anti-skiing plates, a second pipe that is to be connected to said first pipe by being inserted into said short pipe member.

2. The pipe connection of claim 1, further including wrench engaging holes formed in the first end of said sleeve.

3. The pipe connection of claim 1, further including at least one conical groove formed in the externally threaded portion of said sleeve and at least one anti-skiing reed adapted to be secured to the open end of said connection slot and to extend into said at least one conical groove to prevent relative rotation between said connection slot and said sleeve.

4. The pipe connection of claim 3, wherein said conically shaped stopper ring is formed of rubber.

* * * * *